July 3, 1956
A. R. WELCH
2,752,678
MOLDED SPOON CONSTRUCTION
Filed Dec. 24, 1954
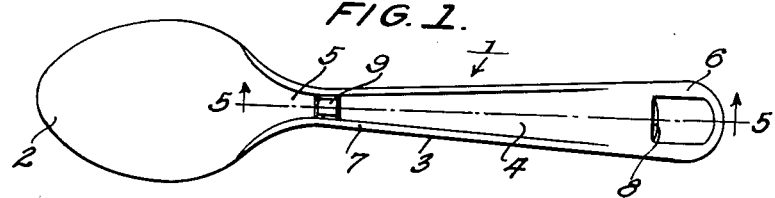
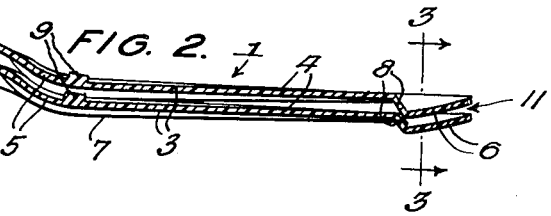
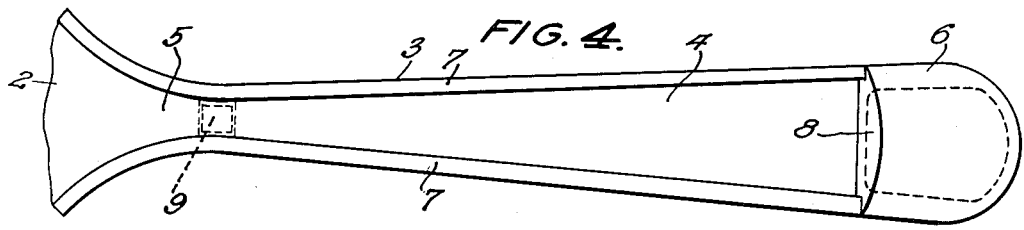
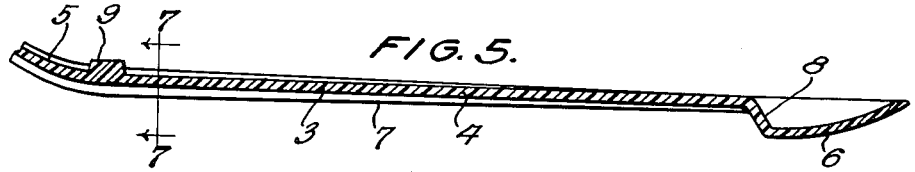
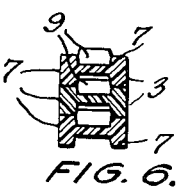
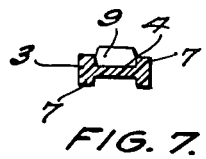
INVENTOR
*Arthur R. Welch*
BY *W. S. Rambo*
ATTORNEY

United States Patent Office 2,752,678
Patented July 3, 1956

2,752,678

MOLDED SPOON CONSTRUCTION

Arthur R. Welch, Columbus, Ohio

Application December 24, 1954, Serial No. 477,557

5 Claims. (Cl. 30—324)

This invention relates to eating utensils, such as spoons and forks, having particular reference to the handle construction thereof. While it is not so restricted, the invention is concerned with an improved teaspoon of molded synthetic resin composition formed to be capable of disposal in definite, adjoining, superposed order with other structurally duplicative spoons, whereby to provide for placing of such spoons in orderly, compact, and vertically disposed stacks or piles suitable for boxing, shipment, storage, or the individual dispensing thereof.

Health ordinances or regulations adopted by certain governmental agencies are now requiring public restaurants, refreshment bars, soda fountains, and the like to protect eating utensils from contamination incident to their handling and dispensing to individual users. In order to comply with these regulations or ordinances, and to do so in an economical yet effective manner, the present invention has for its primary object to provide a spoon or other utensil of molded, integral plastic composition and one which is capable of being mass-produced in multiple-cavity molds of standard injection-type presses at a relatively low cost.

Another object is to provide a utensil wherein the handle of each utensil is so formed as to enable it to interfit or nest with other correspondingly formed utensils when placed in vertical stack-forming order, each utensil maintaining a true horizontal position or plane of disposal in an assembled stack, whereby to permit of compact grouping and placement in vertical chambers of containers adapted for the reception thereof, and, also, to admit of the removal of individual utensils from the bottom of such a stack in an orderly manner and without touching, handling, or contaminating in any way the remaining utensils of the stack.

Another object is to provide a molded plastic spoon or other utensil in which the handle thereof at its sides is formed with spaced, longitudinally extending, reinforcing and positioning ribs which, when the utensil is disposed in a stack, contact with ribs of immediately adjoining duplicative utensils to maintain each utensil of the stack in such horizontal positional order as to retain the vertical relative registry of all utensils forming the stack.

A further object is to provide a molded spoon or other utensil of this character wherein the back surface of the handle is formed at a position adjacent to the spoon bowl with an integral lateral projection adapted to be received in a channel formed between longitudinally extending reinforcing ribs projecting upwardly from the sides of the handle of a next adjoining spoon or utensil when such spoons or utensils are arranged in relatively vertically aligned, stack-producing order, whereby to retain such stacked spoons against relative lateral displacement.

A still further object is to provide a molded spoon or other eating utensil of the type indicated, wherein the construction of the handle portion thereof is such as to provide relatively widely spaced, longitudinally disposed points of contact between the same and the handle portions of adjacent contacting spoons, such spaced points of contact serving to maintain the horizontal position of each of said spoons when disposed in a stack, vertically spacing the ends of the spoons from corresponding adjoining ends of immediately adjacent spoons, relative contacting engagement of such spoons being confined to regions disposed intermediately of their ends.

Another object of the invention is to provide a molded spoon or other utensil of an analogous character in which relative contact between adjacent spoons is effected only at regions contiguous to the forward and rear ends of the spoon handles, the side ribs having contact at the forward ends of the handles and the rear ends of the handles having relative contact by being formed with upstanding concavo-convex formations adapted for disposal in nested order, and formed with interengaging shoulders, the said formations serving to limit relative lateral and longitudinal movement of the rear ends of the spoon handles and serving, in combination with the side ribs of the handles and related features of construction, to retain the vertical order of a plurality of vertically arranged, superposed spoons.

For a further understanding of the invention, reference is to be had to the following description and accompanying drawing, wherein:

Fig. 1 is a bottom plan view of a spoon formed in accordance with the present invention;

Fig. 2 is a vertical longitudinal sectional view taken through a pair of vertically arranged spoons formed in accordance with the invention, the spoons being shown in inverted order;

Fig. 3 is a vertical transverse sectional view taken through the shouldered motion-limiting formations provided on the outer ends of the spoon handles, the plane of the figure being indicated by the lines 3—3 of Fig. 2;

Fig. 4 is a top plan view of the utensil handle construction of the present invention;

Fig. 5 is a longitudinal sectional view taken through the handle construction on the line 5—5 of Fig. 1;

Fig. 6 is a transverse vertical sectional view taken through the handles of a plurality of vertically arranged utensils, and disclosing the interfitting construction of the longitudinally extending side ribs of the utensil handles and their associated depending lug formations employed in preventing relative lateral displacement of the stacked utensils;

Fig. 7 is a detail transverse sectional view taken on the line 7—7 of Fig. 5.

Referring to the drawings by reference characters, there has been disclosed therein an eating utensil which in this instance has been illustrated as constituting a spoon 1, although the features of the invention may be embodied in other handle-equipped utensils, such as a table fork.

The spoon is of integral formation, the same comprising in its preferred embodiment a molding of synthetic plastic composition, although, as will be readily understood, it may be formed from other conventional materials now commonly used in the formation of eating spoons. Plastic materials are, however, preferred for reasons of economy in manufacture and replacement costs. As shown, each spoon comprises a bowl 2 and a handle 3, and it is to the design of the handle 3 of the utensil that the present invention is particularly directed.

The handle, as here illustrated, comprises a web 4 having flat, parallel, upper and lower surfaces, the web increasing in width from a relatively narrow neck region 5, formed at the zone of juncture of the forward part of the handle with the bowl 2 of the spoon, toward a shouldered concavo-convex positioning formation 6 provided at the extreme rear end of the handle. At the sides of the handle web 4 there are provided transversely spaced, longitudinally extending reinforcing and positioning ribs 7. The ribs at their forward ends merge into the bowl 2 of the spoon in a manner bracing and strengthening the narrow neck region 4 of the spoon, and at their rear ends the same taper to minimum height and merge into the positioning formation 6.

The positioning formation 6 on the rear end of each utensil handle comprises a concavo-convex wall configuration which, when the spoons are vertically stacked, interfits in nested order with the corresponding formations of adjoining rear adjacent spoons. When in such order, the adjoining rear ends of a plurality of stacked spoons are restrained against undue lateral displacement by relative contact of the convex sides of the formations, as shown in Fig. 3, and against longitudinal displacement by the interengagement of the shouldered faces 8 of said formations. Also, the nested spoon bowls 2 serve to limit extreme displacement of said spoons by contact with one another.

As shown in Figs. 6 and 7 particularly, the ribs 7 project into the neck region of each spoon handle a short distance above and below the flat upper and lower surfaces of the web 4. In this region the under surface of each web is formed with an integral, downwardly extending, positioning lug 9 which, when the spoons are nested, as in Fig. 6, projects into a channel formed between the upstanding side ribs and thus holds the spoons against lateral displacement.

By these individual and collective features of construction, a plurality of spoons so formed may be disposed in definite horizontal positions in a stack composed of the spoons in vertical superposed order. Spoons as ordinarily formed, when vertically stacked in substantial number, tend to turn a stack composed of the same arcuately, or to one side. This tendency is overcome in the construction of the spoons of the present invention through longitudinally spacing the contact regions provided thereby between adjoining superposed spoons. Thus, adjacent their bowls the vertically aligned spoons contact each other by the engagement of the ribs 7, and at the rear ends thereof by the shouldered formations 6 on their handles. Such engagement, as shown in Fig. 2, maintains the horizontal position of each spoon of the stack and precludes the above noted tendency of stacked spoons to turn arcuately. The shouldered interfaces maintain the stacked spoons against undue relative displacement, permitting a number of such spoons to be handle as a vertical group, as in operations requiring the packing or placing of spoons in containers or dispensing machines. When spoons are so packed and dispensed, sanitation is provided and health regulations and laws governing the public distribution of spoons or the like are observed. The construction defined produces spaces 10 between the forward bowl ends of the superposed spoons, and corresponding spaces 11 between the rear handle ends thereof. Such spacing enables the spoons to be supported in vertical stacks in dispensing machines in a manner enabling the lowermost spoon to be individually withdrawn or discharged from a dispensing machine while the spoons in the stack above the withdrawn spoon are effectively supported in the machine.

While I have, in considerable detail, set forth the construction and advantages of my improved spoon, nevertheless, it will be understood that the single embodiment defined is illustrative merely of but a single preferred form of the present invention and, therefore, the construction is susceptible to certain variations or modifications within the scope of the following claims.

I claim:

1. An eating utensil, comprising: an integral body composed of longitudinally aligned handle and food-retaining portions, said handle including a flat-surfaced web formed at its sides with relatively transversely spaced and longitudinally extending vertical ribs which extend above and below the flat upper and lower surfaces of the web, said ribs having their forward portions merged into the rear part of the food-retaining portion of the utensil, said web adjacent to the juncture of the handle with the food-retaining portion of the utensil being formed on its underside with an integral depending positioning lug, the latter terminating below a horizontal plane defining the bottom surfaces of the rib lying adjacent the lug.

2. An eating utensil as defined in and by claim 1 and wherein the handle portion of the utensil adjacent to the rear end thereof is formed with a shouldered concavo-convex positioning formation.

3. An eating spoon formed for placement in vertically superposed, stacked order with other duplicatively formed spoons, comprising: an integral body formed to include longitudinally disposed, integrally joined bowl, neck, and handle portions, and vertically disposed, longitudinally extending, transversely spaced ribs integrally formed with the side edges of said neck and handle portions of the spoon body, said ribs serving to reinforce the neck and handle portions bearing the same against longitudinal flexure and to space spoons vertically from each other over major surface areas thereof when the same are in stacked order, the neck portion of the spoon body being formed on its underside and between the transversely spaced ribs thereof with integral, downwardly extending positioning means, the latter terminating in a plane below the bottom surfaces of the ribs present on the spoon containing said projection, whereby to enable said means, when the spoons are disposed in vertically aligned, stack-forming order, to extend into a channel provided between the ribs of a next adjoining lower spoon, thereby retaining the spoons against relative lateral displacement.

4. An eating spoon formed for placement in vertically stacked order with other structurally duplicative spoons, comprising: an integral molded body including longitudinally disposed bowl, neck, and handle portions, said neck and handle portions being formed at the sides thereof with vertical, longitudinally extending positioning ribs which, when the spoon is in vertical stacked order with other correspondingly formed spoons, engage with the ribs of adjacent spoons to space relatively the bowl and neck regions of adjacent spoons from each other, the rear end of the handle portion of said spoon being formed with a shouldered, concavo-convex formation having engagement with corresponding formations of adjacent spoons to space relatively the rear ends of the handle portions of said spoons when the latter are disposed in vertically stacked relation, the neck portion of the spoon being formed on its underside between the ribs thereof with a depending positioning lug which extends below the horizontal plane of the lower surfaces of adjacent ribs, said lug being receivable in a channel formed between upwardly projecting ribs of the neck portion of an immediately underlying spoon, whereby to retain stacked spoons against lateral displacement.

5. An eating spoon formed for disposal in superposed, vertically stacked order with other structurally duplicative spoons, said spoons comprising an integral molded body formed to include rigidly united, longitudinally disposed bowl and handle portions, said bowl possessing a substantially concavo-convex formation and which at the rear thereof merges into said handle portion in a manner forming an arcuate neck, said handle portion including a longitudinally extending, flat-surfaced web which increases progressively in width from the neck to the rear of the handle portion, opposite side edges of said neck and handle portions being formed with longitudinally extending, vertically disposed ribs which project above and below said web, said ribs serving to maintain the bowl portions of stacked spoons in relatively spaced order, the rear end of the handle portion of each spoon being formed with an upstanding, concavo-convex wall formation defining an open, downwardly facing, shoulder-forming recess which receives a complemental formation provided on the end of the handle portion of an immediately adjacent underlying spoon, whereby to retain the rear ends of the handie portions of adjacent spoons when in stacked order in spaced relation, said neck portion of each spoon being formed with an integral depending lug adapted to be positioned between the upwardly projecting ribs of an underlying spoon to preclude lateral displacement of the stacked spoons.

References Cited in the file of this patent

UNITED STATES PATENTS

| | | |
|---|---|---|
| 2,083,131 | Tornebohm | June 8, 1937 |
| 2,165,045 | Garside | July 4, 1939 |
| 2,196,244 | Blomqvist | Apr. 9, 1940 |
| 2,654,252 | Davis | Oct. 6, 1953 |